(12) United States Patent
Whitney et al.

(10) Patent No.: US 8,782,601 B2
(45) Date of Patent: Jul. 15, 2014

(54) SYSTEMS AND METHODS FOR APPLYING DYNAMIC RELATIONAL TYPING TO A STRONGLY-TYPED OBJECT-ORIENTED API

(75) Inventors: Jonathan Whitney, Cambridge, MA (US); Matthew D. Connors, Half Moon Bay, CA (US)

(73) Assignee: BMC Software, Inc., Houston, TX (US)

( * ) Notice: Subject to any disclaimer, the term of this patent is extended or adjusted under 35 U.S.C. 154(b) by 137 days.

(21) Appl. No.: 13/251,176

(22) Filed: Sep. 30, 2011

(65) Prior Publication Data

US 2013/0086552 A1   Apr. 4, 2013

(51) Int. Cl.
*G06F 9/44* (2006.01)
(52) U.S. Cl.
CPC .................................... *G06F 9/44* (2013.01)
USPC ............................ 717/116; 717/114; 717/118
(58) Field of Classification Search
USPC ........................................................ 717/116
See application file for complete search history.

(56) References Cited

U.S. PATENT DOCUMENTS

| | | | | |
|---|---|---|---|---|
| 7,158,993 | B1 * | 1/2007 | Schwabe ....................... | 717/116 |
| 7,433,876 | B2 * | 10/2008 | Spivack et al. ................ | 1/1 |
| 7,577,682 | B2 * | 8/2009 | Mueller et al. ................ | 1/1 |
| 7,617,250 | B2 * | 11/2009 | Xu et al. ....................... | 1/1 |
| 7,840,967 | B1 * | 11/2010 | Czajkowski et al. .......... | 717/166 |
| 8,301,436 | B2 * | 10/2012 | Wang ............................. | 704/9 |
| 2002/0095671 | A1 * | 7/2002 | Delo et al. ..................... | 717/174 |
| 2006/0101406 | A1 * | 5/2006 | Goenka et al. ................. | 717/124 |
| 2010/0205205 | A1 * | 8/2010 | Hamel ........................... | 707/769 |
| 2011/0202905 | A1 * | 8/2011 | Mahajan ........................ | 717/140 |
| 2011/0307864 | A1 * | 12/2011 | Grechanik et al. ............ | 717/124 |

OTHER PUBLICATIONS

Stefan Hong and Yuh-Jzer Joung, Meso: An Object-Oriented Programming Language for Building Strongly-typed Internet-Based Network Applications, Mar. 18-22, 2013, ACM.*
Peter S. Canning, William R. Cook, Walter L. Hill and Walter G. Olthoff, Interfaces for Strongly-Typed Object Oriented Programming, Oct. 1-6, 1989, ACM.*
Jackson, D.; Schechter, I.; Shlyakhter, I., "Alcoa: the Alloy constraint analyzer," Software Engineering, 2000. Proceedings of the 2000 International Conference on , vol., No., pp. 730,733, 2000.
Kim, Won, "On Optimizing an SQL-like Nested Query", ACM Transactions on Database Systems, vol. 7, No. 3, Sep. 1982, p. 443-469.

* cited by examiner

*Primary Examiner* — Don Wong
*Assistant Examiner* — Roberto E Luna
(74) *Attorney, Agent, or Firm* — Brake Hughes Bellermann LLP

(57) ABSTRACT

A computer-implemented method includes executing instructions stored on a computer-readable medium. The computer-implemented method includes receiving, at a server hosting a strongly-typed object-oriented application programming interface (API), a single API call to request data from the strongly-typed object-oriented API, where the single API call includes a tuple having multiple object types, obtaining the requested data and returning the requested data.

18 Claims, 5 Drawing Sheets

400

Receive, at a server hosting a strongly-typed object-oriented application programming interface (API), a single API call to request data from the strongly-typed object-oriented API, where the single API call includes a tuple having multiple object types
410

Obtain the requested data
420

Return the requested data
430

FIG. 4

SYSTEMS AND METHODS FOR APPLYING DYNAMIC RELATIONAL TYPING TO A STRONGLY-TYPED OBJECT-ORIENTED API

TECHNICAL FIELD

This description relates to systems and methods for applying dynamic relational typing to a strongly-typed object-oriented application programming interface (API).

BACKGROUND

Object-oriented APIs may be used in a web services environment. For example, a web services server may expose an API to enable a client computing device to obtain data from the web services server through the API. In certain scenarios, the object-oriented API may have certain drawbacks. For instance, the object-oriented API may be difficult for a programmer to program against when creating a dashboard-type user interface (UI). In a dashboard-type UI, it may be desirable to show summaries of data across several class types. However, in order to return these summaries, the summaries have to be pre-defined as classes in the object model. Otherwise, the summaries would not be able to be returned. Developers may bypass the API layer in favor of directly accessing the database, which may result in a loss of database security and/or database integrity. Additionally or alternatively, the server hosting the database may need to support multiple APIs in order to support returning the desired summaries of data, which may mean that developers would need to learn and be able to program against multiple, different APIs to obtain the desired data.

In a similar manner, developers may desire to show a composite view across a number of different objects. However, in order to return the composite view, the developer may need to use multiple API calls to obtain the necessary information to construct the desired composite view. It may be desirable to provide systems and methods to improve the efficiency and ease with which data may be returned using an object-oriented API.

SUMMARY

According to one general aspect, a computer-implemented method includes executing instructions stored on a computer-readable medium. The computer-implemented method includes receiving, at a server hosting a strongly-typed object-oriented application programming interface (API), a single API call to request data from the strongly-typed object-oriented API, where the single API call includes a tuple having multiple object types, obtaining the requested data and returning the requested data.

In another general aspect, a computer program product is tangibly embodied on a computer-readable medium and includes executable code that, when executed, is configured to cause a data processing apparatus to receive, at a server hosting a strongly-typed object-oriented application programming interface (API), a single API call to request data from the strongly-typed object-oriented API, where the single API call includes a tuple having multiple object types, obtain the requested data and return the requested data.

In another general aspect, a computer system includes instructions recorded on a computer-readable medium and that are executable by at least one processor. The system includes a strongly-typed object-oriented application programming interface (API) layer that includes a strongly-typed object-oriented API, where the API layer is configured to receive a single application programming interface (API) call to request data, where the single API call includes a tuple having multiple object types, obtain the requested data and return the requested data.

Implementations of the above general aspects may include one or more of the following features. For example, the requested data may be returned as a list of tuples. The API call may further define relationships between the multiple object types in the tuple. The requested data may be obtained by the strongly-typed object-oriented API according to the relationships between the multiple object types in the tuple as defined in the API call. The requested data may be returned as a list of tuples as obtained by the strongly-typed object-oriented API. The multiple object types may be pre-defined.

In another general aspect, a computer-implemented method includes executing instructions stored on a computer-readable medium and also includes generating a single application programming interface (API) call to request data from a server hosting a strongly-typed object-oriented API, where the single API call includes a tuple having multiple object types, sending the API call to the server and receiving the requested data.

Implementations may include one or more of the following features. For example, the requested data may be received as a list of tuples. The API call may further define relationships between the multiple object types in the tuple. The multiple object types may be pre-defined.

The details of one or more implementations are set forth in the accompanying drawings and the description below. Other features will be apparent from the description and drawings, and from the claims.

BRIEF DESCRIPTION OF THE DRAWINGS

FIG. 4 is a flowchart illustrating example operations of the system of FIG. 1.

DETAILED DESCRIPTION

This document describes systems and methods for applying dynamic relational typing to a strongly-typed object-oriented application programming interface (API). In one exemplary implementation, the systems and techniques include using a strongly-typed dynamic tuple in a single API call to request the return of results in an object-oriented environment as defined on the client side within the tuple in the single API call. For example, a search API call may be used, where a tuple within the body of the search call defines the object type and the relationship between the object types within the tuple. In this manner, developers may obtain the desired data from the server using the single API call, including data to support summaries of data across multiple class types and/or data to support composite views of the data. Developers would not need to issue multiple and/or nested queries to obtain the desired data. Moreover, since it is a strongly-typed dynamic tuple, the integrity and security of the data is protected, as there is no need to bypass the API layer to obtain the desired data. Thus, the server on which the data resides can enforce the API semantics.

Figure 1:
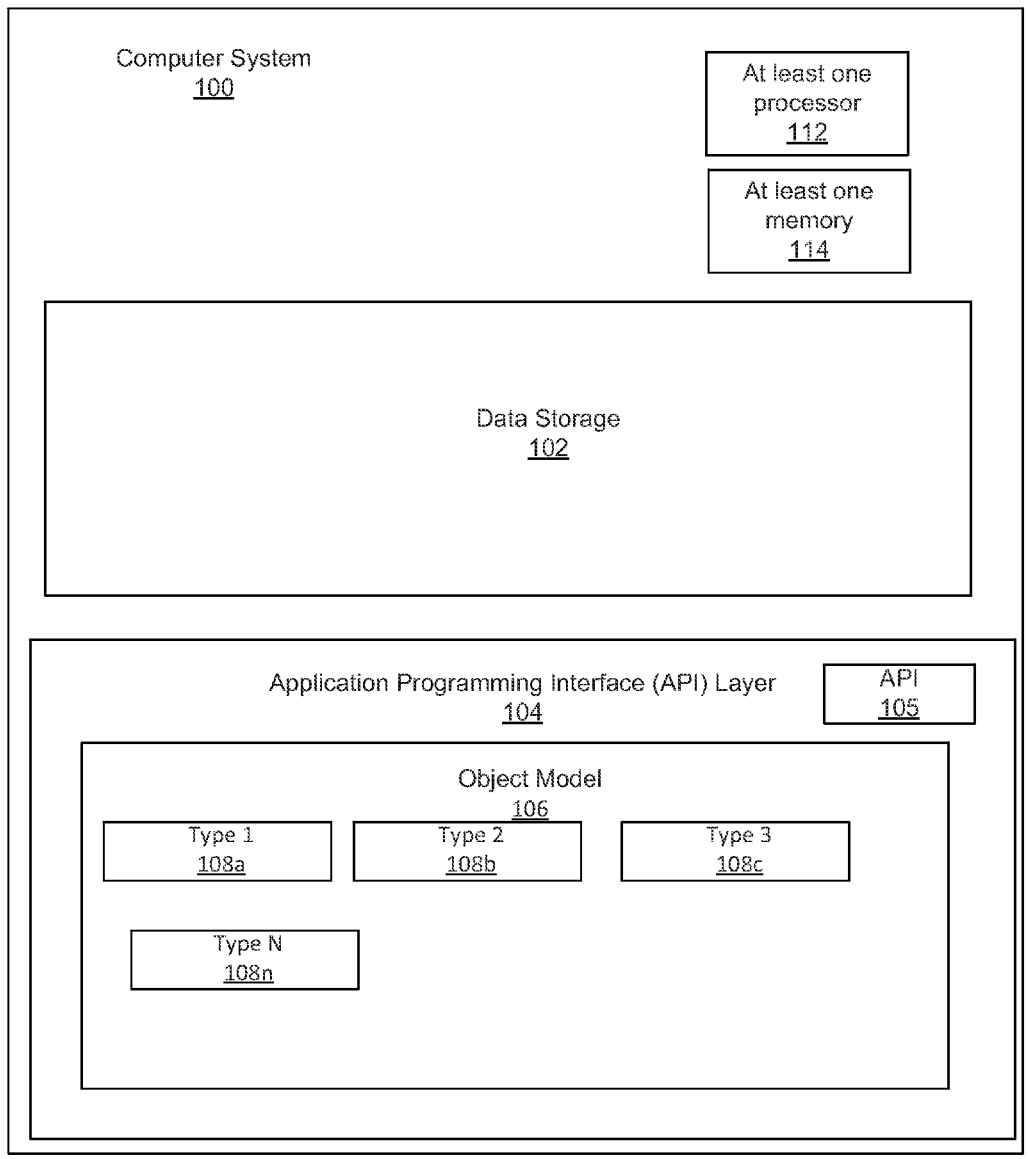
FIG. 1 is an exemplary block diagram of a computer system including a strongly-typed object oriented Application Programming Interface (API).

Referring to FIG. 1, an exemplary block diagram illustrates a computer system 100. The computer system 100 may be, for example, a computer server ("server") that is configured to host a database. In one exemplary implementation, the server may be a web services server. In other exemplary implementations, the server may be a different type of server.

The computer system 100 may include a combination of hardware and software components and/or computer applications to perform various processes. The computer system 100 may include at least one processor 112 and at least one memory 114. That is, for example, the computer system 100 may rely on at least one processor 112 and also may rely on two or more processors executing in parallel to achieve a desired result. The processor 112 may be configured to execute instructions that are stored on the at least one memory 114, which also may be referred to as a computer-related storage medium, and to cause the processor to perform certain actions and/or functions. Meanwhile, the memory 114 may represent any conventional type of computer memory which may be used, for example, to store instructions which, when executed by the at least one processor 112, cause other components within the computer system 100 to perform various functions, and other relevant functions described herein. The computer system 100 may include other hardware and/or software components, which are not illustrated in this exemplary block diagram.

In one exemplary implementation, the computer system 100 may be a server. In other exemplary implementations, the computer system 100 may be a different type of computing device that is configured to perform the same functions described herein as the computer system 100. Also, while a single computer system 100 is shown for illustration purposes, the computer system 100 may be a combination of one or more computer systems 100 that are configured to perform the same functions as described herein.

The computer system 100 includes a data storage module 102 ("database") and an application programming interface (API) layer 104. The database 102 may be any type of database including an object-oriented database, a relational database management system (RDBMS), or other type of database. In one exemplary implementation, information (or data) within the database 102 may be represented in the form of objects. In other exemplary implementations, the database 102 may be represented in other formats.

The database 102 may include information that is to be accessed by computing devices remote to the computer system 100. For example, the database 102 may receive search queries, obtain data from the database 102 and return the requested data to the requesting computing device.

Figure 2:
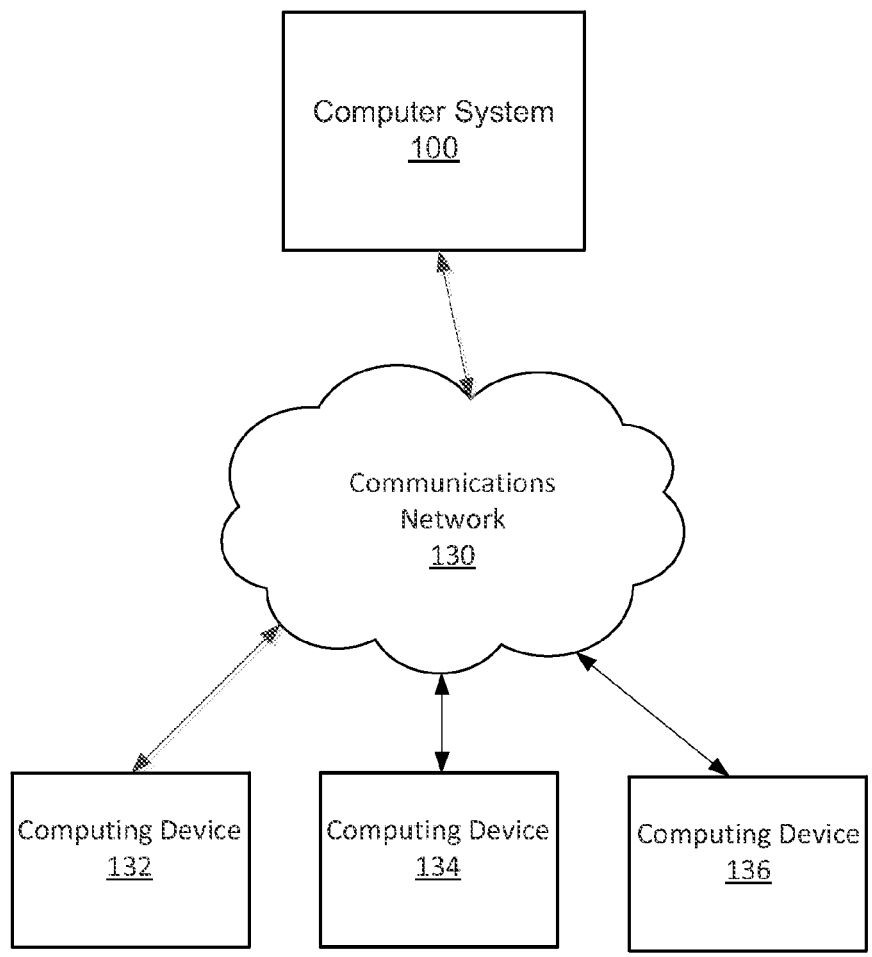
FIG. 2 is a an exemplary block diagram of the computer system of FIG. 1 in communication with other computing devices.

Referring also to FIG. 2, an exemplary block diagram illustrates the computer system 100 of FIG. 1 connected to a communications network 130 to enable communications with other computing devices such as, for example, computing devices 132, 134 and 136. When interfacing and accessing the computer system 100, the computing devices 132, 134 and 136 may be referred to a client devices. The computing devices 132, 134 and 136 may be any type of computing devices including, for example, personal computers, work stations, notebook computers, netbook computers, laptop computers, tablet devices, smartphone devices and any combination of these types of devices. The illustration of three computing devices 132, 134 and 136 is not meant to limit the number of devices that can communicate with the computer system 100 and is for illustration purposes.

The communications network 130 may be any type of wired and/or wireless communications network including, for instance, a local area network (LAN) and/or a wide area network (WAN), including the Internet. In one exemplary implementation, the computer system 100 may be a part of a corporate intranet system and the computing devices 132, 134 and 136 may be client devices that communicate with the computer system 100 using the communications network 130.

The API layer 104 provides an API, which is an interface between the database 102 and devices remote to the computer system 100. For example, the API layer 104 may provide an interface between the database 102 and one or more of the computing devices 132, 134 and 136, which may need to interact with the database 102 through the communications network 130.

In one exemplary implementation, the API layer 104 is a strongly-typed object-oriented API layer that includes a strongly-typed object-oriented API 105 that is capable of interfacing with the database 102. The API layer 104 is configured to receive API calls, where the API calls include requests to perform operations on the database 102 including, for example, reads, writes, updates, create, deletes and other operations or combinations of operations. The API calls also may include requests to the API layer 104 and the API 105 to obtain information or to query not only the database 102, but also from other sources including, for example, applications and/or other databases.

The API layer 104 may include an object model 106. The object model 106 may define the objects contained in the database 102. The object model 106 may define the objects in terms of object class or objects types 108a-108c . . . 108n. The object model 106 may define an unlimited number of object types 108a-108c . . . 108n.

The use of an API enables software or application developers to write code that is compatible with the API in order to interface and interact with the database 102. The developers may use one or more programming languages (e.g., object-oriented programming languages) to write programs or code that is compatible with the API to perform operations on the database 102 and to receive information from the database 102 through the API in the API layer 104. In this manner, the computer system 100 exposes the API in the API layer 104 such that developers may program against the API to interface with the database 102 from other computing devices (e.g., computing devices 132, 134 and 136). The strongly-typed object-oriented API layer 104 may be configured to expose to the client (e.g., computing devices 132, 134 or 136) that the database 102 includes a store of objects, even if the database 102 is not an object-oriented database.

In one exemplary implementation, the API in the API layer 104 may be a strongly-typed object-oriented API (e.g., a strongly-typed object-oriented web services API). A strongly-typed object-oriented API means that the API layer 104 enforces the semantics for interacting with the API to protect the security, bounds checking and integrity of the database 102, which operates behind the API layer 104. There is syntactical enforcement of the object types. In contrast, a weakly-typed API may not have any syntactical enforcement and, thus, weaken the security and integrity of a database.

In one exemplary implementation, the API layer 104 may be configured to receive a single API call that requests data from the API 105, which the API 105 may obtain from a source (e.g., the database 102). The single API call may include a tuple that includes multiple object types in the tuple. The single API call also may define the relationships between the multiple object types contained in the tuple. The object types may be known and predefined in the object model 106 (e.g., Type 1 (108a)...Type N (108n)). However, the particular grouping or relationships between the object types may not be known in advance by the object model 106 or the database 102, in general. Instead, the grouping or relationships defined in the single API call are defined by the requesting device defines the relationship between the object types in the tuple. The API layer 104 is configured to receive, recognize and act on this type of API call that includes such a tuple. The API layer 104 is configured to process the API call and to obtain the requested data from the desired source (e.g., the database 102) and to return the data, as requested, to the requesting party.

In this manner, a new class of objects or object types may be defined in this API call with this dynamically typed tuple. The known object types may serve as the building blocks for defining the new grouping of the object types. This enables the API layer 104 to remain a strongly-typed API and, at the same time, allow for flexibility for requesting devices to obtain composite data grouped in a particular manner as defined by the requesting device using a single API call. The tuple is dynamically typed because it can be defined to include any known object type.

For example, the below Code Snippet 1 provides an exemplary syntax of the single API call. The exemplary syntax is provided as an illustration and is not meant to be limiting. Other syntaxes may provide the same functionality as the one in the Code Snippet 1.

---
Code Snippet 1
---

```
POST .../<classname>/search
JSON body {
    Tuple = (<classname> as myObj, <classname>.r1.r2.r3 as myR3,
<classname>.r4.r5 as myR5, <classname>.a1 as myA1)
    Criteria = (some Boolean expression on myObj, myR3, myR5 and
myA1)
}
```

In Code Snippet 1, the "POST" function is a search API call requesting to perform a search on the database (e.g., database 102). The "POST" is an hypertext protocol (HTTP) command. The "Tuple" includes as object types "myObj," "myR3," "myR5" and "myA1." The object types would correspond to known object types in the object model 106 (e.g., Type 1 (108a), etc.). The "Criteria" in the API call defines the relationship between the object types listed in the tuple. In one exemplary implementation, the "Criteria" may define the relationship between the object types using one or more Boolean expressions or some other type of operators that are configured to express relationships between items.

The API layer 104 would receive the API call, as illustrated in Code Snippet 1, and the API 105 would process the API call to obtain the data from the database 102, as defined in the API call. The API layer 104 would return the requested data. The requested data is returned as a list of tuples of objects of the type (<classname>, the type of <classname>.r1.r2.r3, the type of <classname>.r4.r5, the type of <classname>.a1).

The requesting party may then use the returned data in the form of the list of tuples in various manners. For example, the requested data may be for use in a user interface. For example, a developer may design a custom user interface that uses data from the database 102, as requested and obtained through the API 105 in the API layer 104 using API calls, including API calls having one or more tuples, as illustrated and described above. In this manner, the API call specifies the data type to be returned. The tuple itself is a first class object and the introduction of the request for the tuple introduces a new class to the object model at runtime, where each member of the tuple is an object type in the object model (including other tuples).

While the Code Snippet 1 illustrates an API call with a single tuple having multiple object types, other single API calls may include multiple tuples, where each tuple includes multiple object types. The single API calls with multiple tuples also may include one or more statements (e.g., "Criteria" statement) that defines the relationship between the object types and that specifies the data being requested.

Figure 3:
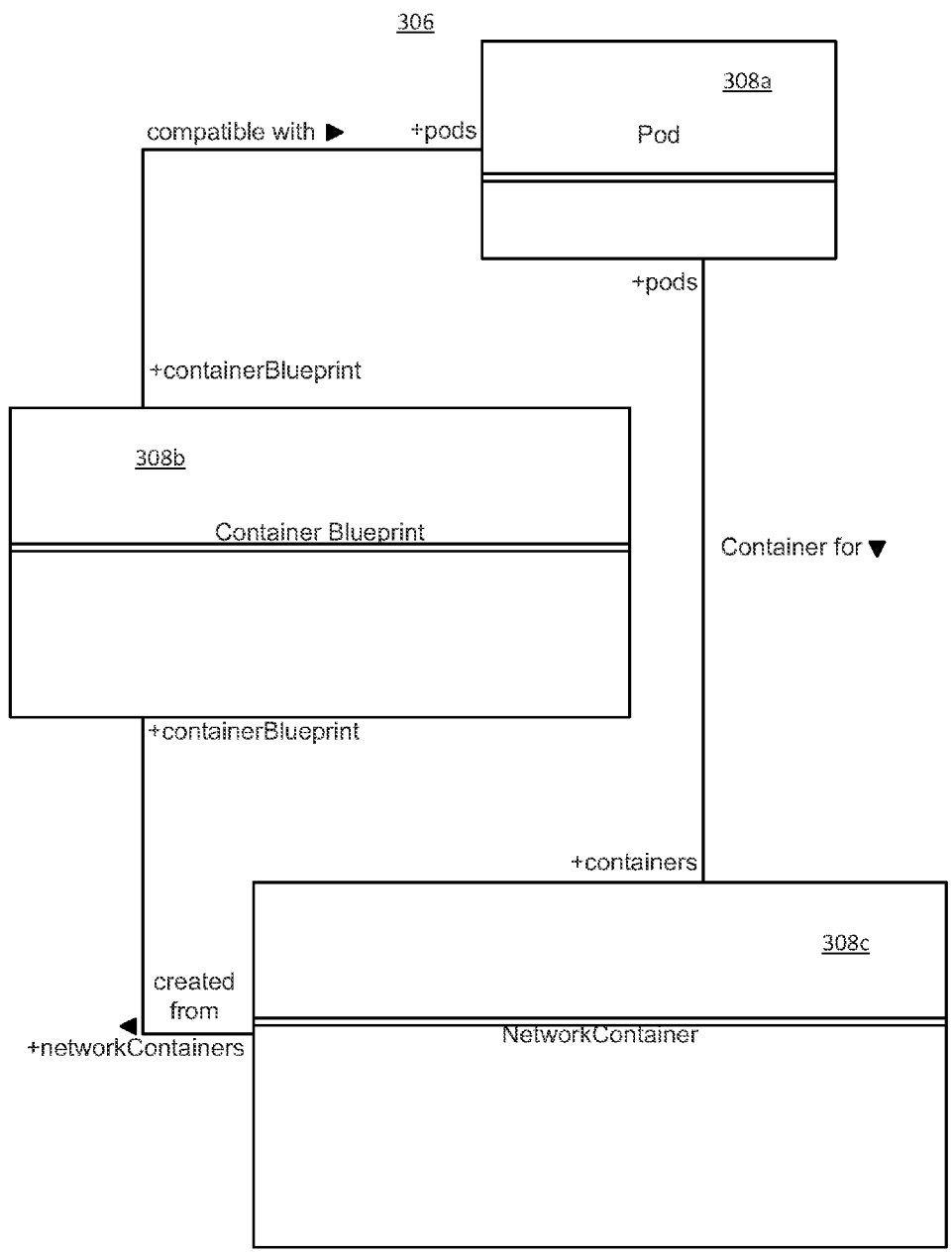
FIG. 3 is an exemplary diagram of different object types in an object model.

Referring to FIG. 3, an exemplary diagram of an object model 306 is illustrated. The object model 306 includes the object types Pod 308a, Container Blueprint 308b and Network Container 308c. In this example, assume the requestor desires to obtain and show the Pod 308a, the Container Blueprint 308b with which the Pod 308a is compatible and the Network Container 308c created in the Pod 308a from the Container Blueprint 308b. Using a conventional object-oriented API, it would be necessary to issue nested queries and then to merge the data, which would require a lot of coding on the client side and ultimately is not efficient.

Instead, a single API call may be issued to obtain the desired data, as shown below in Code Snippet 2.

---
Code Snippet 2
---

```
POST .../Pod/search?1=CB.name&2=NC.name
Tuple = (Pod as PD, ContainerBlueprint as CB, NetworkContainer as
NC)
Criteria = (PD.containerBlueprints contains CB and PD.containers
contains NC and CB.networkContainers contains NC)
```

The "POST" search mechanism is used to issue a search for Pod 308a. The "Tuple" includes the list of the desired object types: Pod 308a, Container Blueprint 308b and Network Container 308c. The "Criteria" defines the desired relationship between the object types listed in the tuple. As noted above with respect to Code Snippet 1, the syntax used in Code Snippet 2 is merely exemplary and other code snippets may be used.

The API layer 104 is configured to receive the API call as illustrated in Code Snippet 2 and to process the API call using the API 105 to obtain the requested data from the database 102 (assuming that object model 306 was included as the object model 106 in the computer system 100 of FIG. 1). The API layer 104 would return the result to the requesting party, where the result is a list of tuples that each includes three elements. The result may be returned in the form of a three column table using the single API call.

Referring to FIG. 4, a flowchart of an exemplary process 400 is illustrated. Process 400 includes receiving, at a server hosting a strongly-typed object-oriented API, a single API call to request data from the strongly-typed object-oriented API, where the single API call includes a tuple having multiple object types (410). For example, as discussed above, the API layer 104 may receive the single API call. The API layer 104 may be a strongly-typed object-oriented API layer. The tuple may include a statement that defines the relationship between the objects listed in the tuple. The request may originate from one of the computing devices 132, 134 or 136 through the communications network 130.

Process 400 includes obtaining the requested data (420). For example, as discussed above, the API layer 104 may use the information in the tuple and the statement defining the relationship of the object types in the tuple to obtain the data a source (e.g., from the database 102).

Process 400 includes returning the requested data (430). For example, the API layer 104 may return the requested data to the originating party (e.g., to one of the computing devices 132, 134 or 136 through the communications network 130).

Figure 5:
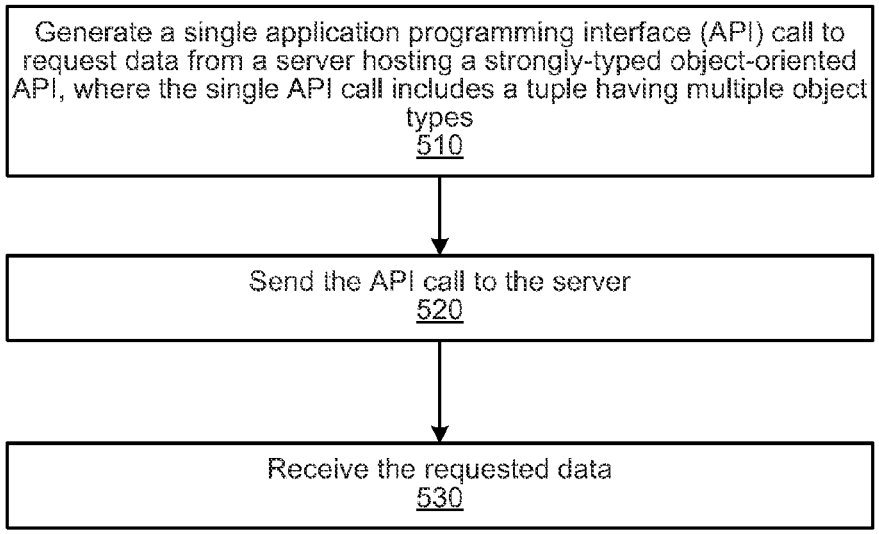
FIG. 5 is a flowchart illustrating example operations of the system of FIG. 2.

Referring to FIG. 5, a flowchart of an exemplary process 500 is illustrated. Process 500 includes generating a single API call to request data from a server hosting a strongly-typed object-oriented API, where the single API call includes a tuple having multiple object types (510). For example, one of the computing devices 132, 134 or 136 may generate the single API call to request data from the API layer 104 on the computer system 100. The API call may include the tuple and a statement defining the relationship of the object types listed in the tuple, as discussed above.

Process 500 includes sending the API call to the server (520). For example, one of the computing devices 132, 134 or 136 may send the API call to the computer system 100 through the communications network 130.

Process 500 includes receiving the requested data (530). For example, one of the computing devices 132, 134 or 135 may receive the requested data from the computer system 100 through the communications network 130.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A computer-implemented method executing instructions stored on a non-transitory computer-readable medium, the method comprising:
receiving, at an application programming interface (API) layer on a server hosting a strongly-typed object-oriented API, a single API call to request data from the strongly-typed object-oriented API;
enforcing, at the API layer, semantics for interacting with the API for security of at least one database disposed behind the API layer, wherein the single API call includes code that defines the request for the data using a dynamically-typed tuple having multiple object types and wherein the code uses one or more statements to define relationships between the multiple object types in the tuple;
in response to receiving the single API call, performing a search of the at least one database using the strongly-typed object-oriented API through the API layer;
obtaining the requested data from the at least one database in response to the search; and
returning the requested data.

2. the computer-implemented method of claim 1 wherein returning the requested data comprises returning the requested data as a list of tuples.

3. the computer-implemented method of claim 1 wherein obtaining the requested data comprises obtaining the requested data by the strongly-typed object-oriented API according to the relationships between the multiple object types in the dynamically-typed tuple as defined in the single API call.

4. the computer-implemented method of claim 3 wherein returning the requested data comprises returning the requested data as a list of tuples as obtained by the strongly-typed object-oriented API.

5. the computer-implemented method of claim 1 wherein the multiple object types are pre-defined.

6. A computer program product, the computer program product being tangibly embodied on a non-transitory computer-readable medium and including executable code that, when executed, is configured to cause a data processing apparatus to:
- receive, at an application programming interface (API) layer on a server hosting a strongly-typed object-oriented API, a single API call to request data from the strongly-typed object-oriented API;
- enforce, at the API layer, semantics for interacting with the API for security of at least one database disposed behind the API layer, wherein the single API call includes code that defines the request for the data using a dynamically-typed tuple having multiple object types and wherein the code uses one or more statements to define relationships between the multiple object types in the tuple;
- in response to receiving the single API call, perform a search of the at least one database using the strongly-typed object-oriented API through the API layer;
- obtain the requested data from the at least one database in response to the search; and
- return the requested data.

7. the computer program product of claim 6 wherein the executable code that, when executed, is configured to cause the data processing apparatus to return the requested data comprises executable code that, when executed, is configured to cause the data processing apparatus to return the requested data as a list of tuples.

8. the computer program product of claim 6 wherein the executable code that, when executed, is configured to cause the data processing apparatus to obtain the requested data comprises executable code that, when executed, is configured to cause the data processing apparatus to obtain the requested data by the strongly-typed object-oriented API according to the relationships between the multiple object types in the dynamically-typed tuple as defined in the single API call.

9. the computer program product of claim 8 wherein the executable code that, when executed, is configured to cause the data processing apparatus to return the requested data comprises executable code that, when executed, is configured to cause the data processing apparatus to return the requested data as a list of tuples as obtained by the strongly-typed object-oriented API.

10. the computer program product of claim 6 wherein the multiple object types are pre-defined.

11. A computer system including instructions recorded on a non-transitory computer-readable medium and executable by at least one processor, the system comprising:
- at least one database; and
- a strongly-typed object-oriented application programming interface (API) layer that includes a strongly-typed object-oriented API, wherein the API layer is configured to cause the at least one processor to:
    - receive a single API call to request data;
    - enforce, at the API layer, semantics for interacting with the API for security of the at least one database disposed behind the API layer, wherein the single API call includes code that defines the request for the data using a dynamically-typed tuple having multiple object types and wherein the code uses one or more statements to define relationships between the multiple object types in the tuple;
    - in response to receiving the single API call, perform a search of the at least one database using the strongly-typed object-oriented API through the API layer;
    - obtain the requested data from the at least one database in response to the search; and
    - return the requested data.

12. the computer system of claim 11 wherein the API layer is configured to return the requested data as a list of tuples.

13. the computer system of claim 11 wherein the API layer is configured to obtain the requested data according to the relationships between the multiple object types in the dynamically-typed tuple as defined in the single API call.

14. the computer system of claim 13 wherein the API layer is configured to return the requested data as a list of tuples as obtained by the API layer.

15. the computer system of claim 11 wherein the multiple object types are pre-defined.

16. A computer-implemented method executing instructions stored on a non-transitory computer-readable medium, the method comprising:
- generating a single application programming interface (API) call to request data from an API layer on a server hosting a strongly-typed object-oriented API, wherein:
    - the single API call includes code that defines the request for the data using a dynamically-typed tuple having multiple object types and wherein the code uses one or more statements to define relationships between the multiple object types in the tuple, and
    - the API layer is used to enforce semantics for interacting with the API for security of at least one database disposed behind the API layer;
- sending the single API call to the server; and
- responsive to sending the single API call, receiving the requested data obtained from the at least one database.

17. the computer-implemented method of claim 16 wherein receiving the requested data comprises receiving the requested data as a list of tuples.

18. the computer-implemented method of claim 16 wherein the multiple object types are pre-defined.

* * * * *

UNITED STATES PATENT AND TRADEMARK OFFICE
CERTIFICATE OF CORRECTION

| | | |
|---|---|---|
| PATENT NO. | : 8,782,601 B2 | Page 1 of 1 |
| APPLICATION NO. | : 13/251176 | |
| DATED | : July 15, 2014 | |
| INVENTOR(S) | : Jonathan Whitney et al. | |

It is certified that error appears in the above-identified patent and that said Letters Patent is hereby corrected as shown below:

In the Claims

In column 8, line 55, in claim 2, delete "the" and insert -- The --, therefor.

In column 8, line 58, in claim 3, delete "the" and insert -- The --, therefor.

In column 8, line 64, in claim 4, delete "the" and insert -- The --, therefor.

In column 9, line 1, in claim 5, delete "the" and insert -- The --, therefor.

In column 9, line 25, in claim 7, before "computer" delete "the" and insert -- The --, therefor.

In column 9, line 31, in claim 8, before "computer" delete "the" and insert -- The --, therefor.

In column 9, line 39, in claim 9, before "computer" delete "the" and insert -- The --, therefor.

In column 9, line 46, in claim 10, before "computer" delete "the" and insert -- The --, therefor.

In column 10, line 19, in claim 12, before "computer" delete "the" and insert -- The --, therefor.

In column 10, line 21, in claim 13, before "computer" delete "the" and insert -- The --, therefor.

In column 10, line 25, in claim 14, before "computer" delete "the" and insert -- The --, therefor.

In column 10, line 28, in claim 15, before "computer" delete "the" and insert -- The --, therefor.

In column 10, line 48, in claim 17, delete "the" and insert -- The --, therefor.

In column 10, line 51, in claim 18, delete "the" and insert -- The --, therefor.

Signed and Sealed this
Twenty-fifth Day of November, 2014

Michelle K. Lee
*Deputy Director of the United States Patent and Trademark Office*